US012807230B2

(12) United States Patent
Horiguchi

(10) Patent No.: US 12,807,230 B2
(45) Date of Patent: Nov. 24, 2026

(54) STEERING ADVICE DEVICE

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/404,302

(22) Filed: Dec. 1, 2025

(65) Prior Publication Data

US 2026/0159163 A1 Jun. 11, 2026

(30) Foreign Application Priority Data

Dec. 11, 2024 (JP) ................................ 2024-216190

(51) Int. Cl.
*B62D 15/02* (2006.01)

(52) U.S. Cl.
CPC ................................ *B62D 15/0295* (2013.01)

(58) Field of Classification Search
CPC ................................................ B62D 15/0295
See application file for complete search history.

(56) References Cited

U.S. PATENT DOCUMENTS 12,168,486 B2 * 12/2024 Fujimoto ............. B62D 15/025
12,187,121 B2 * 1/2025 Suzuki ................... B60K 35/10
2008/0061954 A1 * 3/2008 Kulas ..................... B60K 35/10
340/461
2011/0133919 A1 * 6/2011 Evarts .................... B62D 1/046
340/439
2016/0075377 A1 * 3/2016 Tomozawa ................ B60R 1/27
701/41
2016/0129836 A1 * 5/2016 Sugita .................. B60K 35/231
701/41
2018/0284965 A1 * 10/2018 Nagasawa ............. B60K 35/10
2018/0327028 A1 * 11/2018 Kamiyama ............... B60R 1/28
2019/0009676 A1 * 1/2019 Yokota ................... B60K 35/10
2019/0039593 A1 * 2/2019 Oyama .................. B60K 35/10
2019/0100244 A1 * 4/2019 Torii ...................... B60K 35/28
2020/0089226 A1 * 3/2020 Breisinger ............. B60K 35/10
2021/0039713 A1 * 2/2021 Hara ........................ B62D 1/04
2022/0306189 A1 * 9/2022 Ojima .................... B60K 35/22

FOREIGN PATENT DOCUMENTS

JP 2007-83952 A 4/2007

* cited by examiner

*Primary Examiner* — Brian P Yenke
(74) *Attorney, Agent, or Firm* — Rimon P.C.

(57) ABSTRACT

A steering advice device to be applied to a vehicle includes an image display area, a vehicle speed detector, a steering holding position detector, and a steering advice computing unit. The steering advice computing unit includes a corner detector, a curvature calculating unit, an estimated steering angle calculating unit, a turned steering position calculating unit, a proper region determining unit, an instructed steering holding position setting unit, and a display instruction unit. The curvature calculating unit calculates a degree of curvature of a corner in front of the vehicle. The estimated steering angle calculating unit calculates an estimated steering angle for cornering. The turned steering position calculating unit calculates a turned steering holding position for cornering. The instructed steering holding position setting unit sets an instructed steering holding position for cornering. The display instruction unit displays the instructed steering holding position in the image display area.

6 Claims, 11 Drawing Sheets

STEERING ADVICE DEVICE

CROSS-REFERENCE TO RELATED APPLICATIONS

The present application claims priority from Japanese Patent Application No. 2024-216190 filed on Dec. 11, 2024, the entire contents of which are hereby incorporated by reference.

BACKGROUND

The disclosure relates to a steering advice device.

While a driver who drives a vehicle drives the vehicle at high speed on a race track, such as a circuit, the driver holds the steering wheel (hereinafter referred to as "steering") to reduce rolling of the driver's body when the driver turns the steering relatively sharply or when the driver travels around a corner where a large lateral acceleration (lateral G) is generated. However, it may be difficult to reduce rolling of the body depending on the holding positions of the driver's hands on the steering.

When the driver's body is not supported by both hands holding the steering during cornering of the vehicle, the driver may have difficulty with accurately operating the accelerator and the brake. Furthermore, it may be difficult for beginner drivers to anticipate the degree of curvature before entering a corner, and thus the beginner drivers often cannot accurately determine how much to turn the steering when entering the corner at high speed.

For example, Japanese Unexamined Patent Application Publication (JP-A) No. 2007-83952 indicates that a holding position on a steering by a driver is detected before a corner (curve) existing in front of a travelling vehicle and it is determined whether a steering operation for travelling around the corner existing ahead can be performed based on the holding position. JP-A No. 2007-83952 also discloses a technique to issue a warning to the driver when it is determined that the steering operation is difficult to perform.

SUMMARY

An aspect of the disclosure provides a steering advice device configured to be applied to a vehicle. The steering advice device includes an image display area, a vehicle speed detector, a steering holding position detector, and a steering advice computing unit. The image display area is provided at a position visible from a driver of the vehicle. The vehicle speed detector is configured to detect a speed of the vehicle. The steering holding position detector is configured to detect a steering holding position of each of hands of the driver on a steering. The steering has a proper region set as an absolute region in which the driver can appropriately perform a steering operation while holding the steering. The steering advice computing unit includes a corner detector, a curvature calculating unit, an estimated steering angle calculating unit, a turned steering position calculating unit, a proper region determining unit, an instructed steering holding position setting unit, and a display instruction unit. The corner detector is configured to detect a corner in a travelling direction of the vehicle. The curvature calculating unit is configured to calculate a degree of curvature of the corner detected by the corner detector. The estimated steering angle calculating unit is configured to calculate an estimated steering angle of the steering for cornering based on the speed of the vehicle detected by the vehicle speed detector and the degree of curvature of the corner calculated by the curvature calculating unit. The turned steering position calculating unit is configured to calculate a turned steering holding position to be obtained by turning the steering at the estimated steering angle calculated by the estimated steering angle calculating unit. The proper region determining unit is configured to determine whether the turned steering holding position calculated by the turned steering position calculating unit is out of the proper region. The instructed steering holding position setting unit is configured to set an instructed steering holding position in the proper region when the proper region determining unit determines that the turned steering holding position calculated by the turned steering position calculating unit is out of the proper region. The display instruction unit is configured to display an image of the instructed steering holding position set by the instructed steering holding position setting unit in the image display area.

An aspect of the disclosure provides a steering advice device configured to be applied to a vehicle. The steering advice device includes an image display area, a vehicle speed detector, a steering holding position detector, and circuitry. The image display area is provided at a position visible from a driver who drives the vehicle. The vehicle speed detector is configured to detect a speed of the vehicle. The steering holding position detector is configured to detect a steering holding position of each of hands of the driver on a steering. The steering has a proper region set as an absolute region in which the driver can appropriately perform a steering operation while holding the steering. The circuitry is configured to detect a corner in a travelling direction of the vehicle. The circuitry is configured to calculate a degree of curvature of the detected corner. The circuitry is configured to calculate an estimated steering angle of the steering for cornering based on the speed of the vehicle detected by the vehicle speed detector and the calculated degree of curvature of the corner. The circuitry is configured to calculate a turned steering holding position to be obtained by turning the steering at the calculated estimated steering angle. The circuitry is configured to determine whether the calculated turned steering holding position is out of the proper region. The circuitry is configured to set an instructed steering holding position in the proper region, when the calculated turned steering holding position is determined to be out of the proper region. The circuitry is configured to display an image of the set instructed steering holding position in the image display area.

DETAILED DESCRIPTION

In the technique disclosed in JP-A No. 2007-83952, a warning is issued when it is determined that traveling around a corner is difficult with a steering turned by a driver at holding positions on the steering. Thus, when the driver drives around a corner, it may be difficult for the driver to recognize where to hold on the steering.

Furthermore, with the technique disclosed in JP-A No. 2007-83952, there is room for improvement in that the driver does not know whether the driver's body can be supported in cornering with the steering turned by the driver at holding positions on the steering.

It is desirable to provide a steering advice device capable of providing the driver with accurate advice on where to hold on the steering so that the driver can perform a steering operation while the driver's body is supported when the driver travels around a corner at high speed.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
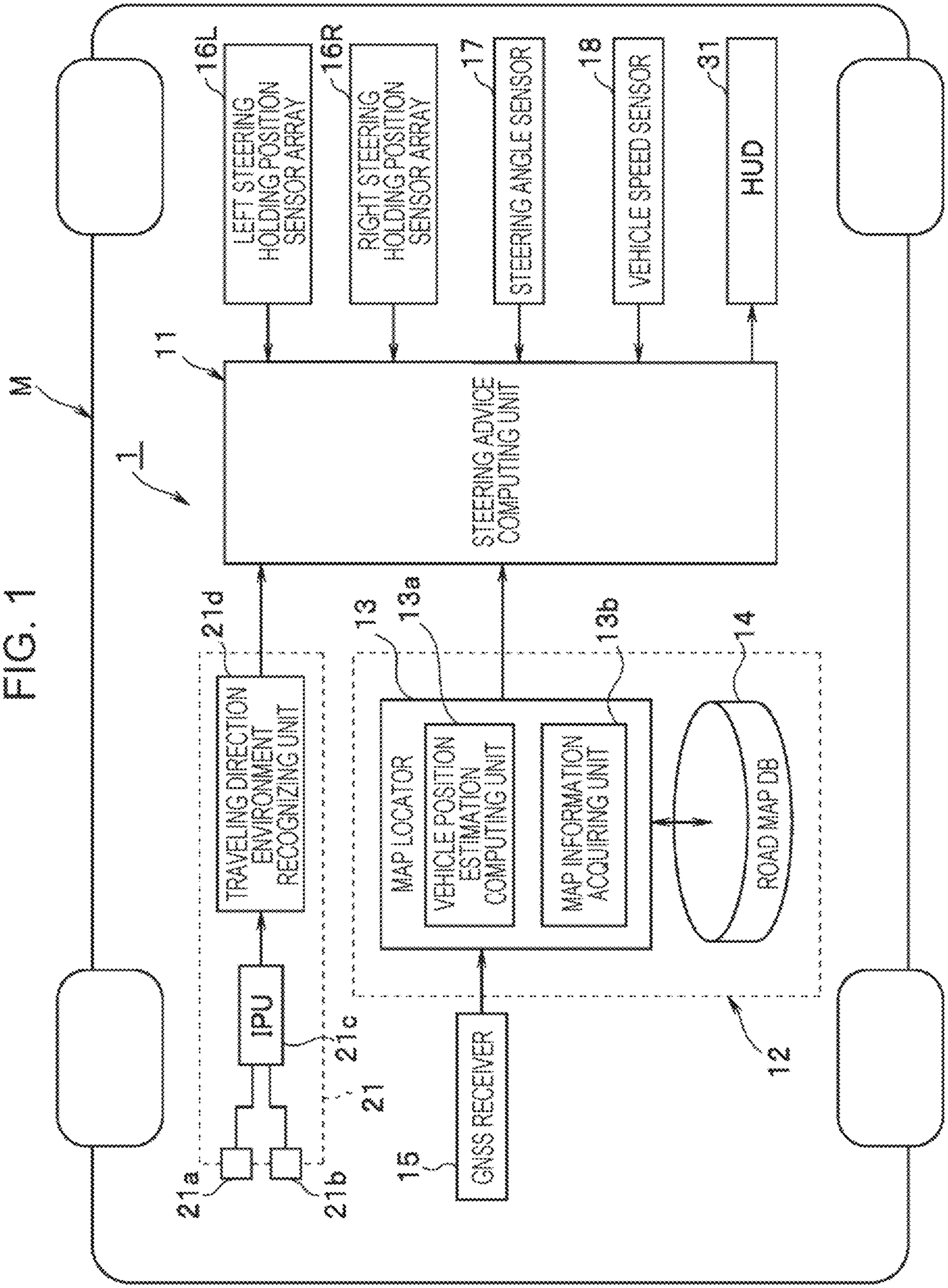
FIG. 1 is a schematic block diagram of a steering advice device.

A vehicle M according to the embodiment illustrated in FIG. 1 is a sports car. The vehicle M can travel on a circuit. In the embodiment of the disclosure, a right steering wheel vehicle is used as the vehicle M (see FIG. 2).

The vehicle M is provided with a steering advice device 1. The steering advice device 1 includes a steering advice computing unit 11.

The steering advice computing unit 11, a map locator computing unit 13, which will be described later, and a travelling direction environment recognizing unit 21*d*, which will be described later, are each formed as a microcontroller. Each microcontroller includes a central processing unit (CPU), a random access memory (RAM), a read-only memory (ROM), a rewritable nonvolatile memory (flash memory or electrically erasable programmable read-only memory, EEPROM), and peripheral equipment. The RAM of the microcontroller is provided as a work area of the CPU and temporarily stores various data used in the CPU. The ROM stores programs, fixed data, or the like that the CPU uses to execute each processing. Note that a CPU is also referred to as a microprocessor (MPU) or processor. In addition, a graphics processing unit (GPU) or a graphics streaming processor (GSP) may be used in place of a CPU. Alternatively, a selective combination of a CPU, a GPU, and a GSP may be used.

A locator unit 12 and a camera unit 21 are coupled to an input side of the steering advice computing unit 11. In addition, a left steering holding position sensor array 16L and a right steering holding position sensor array 16R as steering holding position detectors, a steering angle sensor 17, and a vehicle speed sensor 18 as a vehicle speed detector are coupled to the input side of the steering advice computing unit 11. Meanwhile, a head-up display (HUD) 31 is coupled to an output side of the steering advice computing unit 11.

The steering angle sensor 17 is configured to detect a steering angle of a steered wheel (front wheel). The vehicle speed sensor 18 is configured to detect a vehicle speed of the vehicle M. The vehicle speed sensor 18 is configured to detect the vehicle speed from, for example, an average value of wheel speeds detected by wheel speed sensors provided on the four wheels.

The locator unit 12 is configured to estimate the position (vehicle position) of the vehicle M on a road map and acquire road map data on the road in front of the vehicle M. Meanwhile, the camera unit 21 is configured to acquire travelling environment information on the environment in front of the vehicle M.

The locator unit 12 includes the map locator computing unit 13 and a road map database 14. The road map database 14 stores digital map data. Road map information of the digital map data includes at least course specification data (course widths, curvatures of corners and hairpin curves, cants, etc.) of the circuit where the vehicle M will run, and position coordinate data (latitude, longitude, and altitude) of each course specification data item. Note that the course specification data of the circuit and the positioning coordinate data are collectively referred to as "course information" for convenience.

In addition, a global navigation satellite system (GNSS) receiver 15 is coupled to an input side of the map locator computing unit 13. The GNSS receiver 15 is configured to receive positioning signals transmitted from positioning satellites. The map locator computing unit 13 has a vehicle position estimation computing unit 13*a* and a map information acquiring unit 13*b*.

The vehicle position estimation computing unit 13*a* is configured to estimate the position of the vehicle M from positioning signals received by the GNSS receiver 15. The map information acquiring unit 13*b* is configured to acquire, based on the vehicle position information estimated by the vehicle position estimation computing unit 13*a*, the road map information of the circuit where the vehicle M will run from the digital map data stored in the road map database 14. Alternatively, the road map information of the circuit where the vehicle M will run may be acquired by the driver by manually searching digital map data and downloading the result to the map information acquiring unit 13*b*.

The camera unit 21 is fixed at the upper center of the front interior of the vehicle M. The camera unit 21 includes an on-vehicle camera having a main camera 21*a* and a sub camera 21*b* disposed at positions symmetric with respect to the center in the vehicle width direction, an image processing unit (IPU) 21*c*, and the travelling direction environment recognizing unit 21*d*. The camera unit 21 is a stereo camera configured to take an image of a predetermined region in front of the vehicle M by capturing images by the main camera 21*a* and the sub camera 21*b*. The IPU 21*c* is configured to perform predetermined image processing on images of the surrounding environment in the travelling direction of the vehicle M captured by the main camera 21*a* and the sub camera 21*b* and output the images to the travelling direction environment recognizing unit 21*d*.

The travelling direction environment recognizing unit 21*d* is configured to recognize a road shape (course width, curvature, etc.) and an obstacle in front of the vehicle M travelling in the circuit course based on the received image information on the environment in front of the vehicle M.

The right and left steering holding position sensor arrays 16R and 16L are configured to detect steering holding positions of both hands Rh and Lh of the driver on a rim 2*r* of a steering wheel (hereinafter referred to as "steering") 2. Here, a state of "steering holding" indicates that the driver holds the rim 2*r* of the steering 2 with a predetermined gripping force or more that still allows the driver to operate the steering 2.

Figure 3:
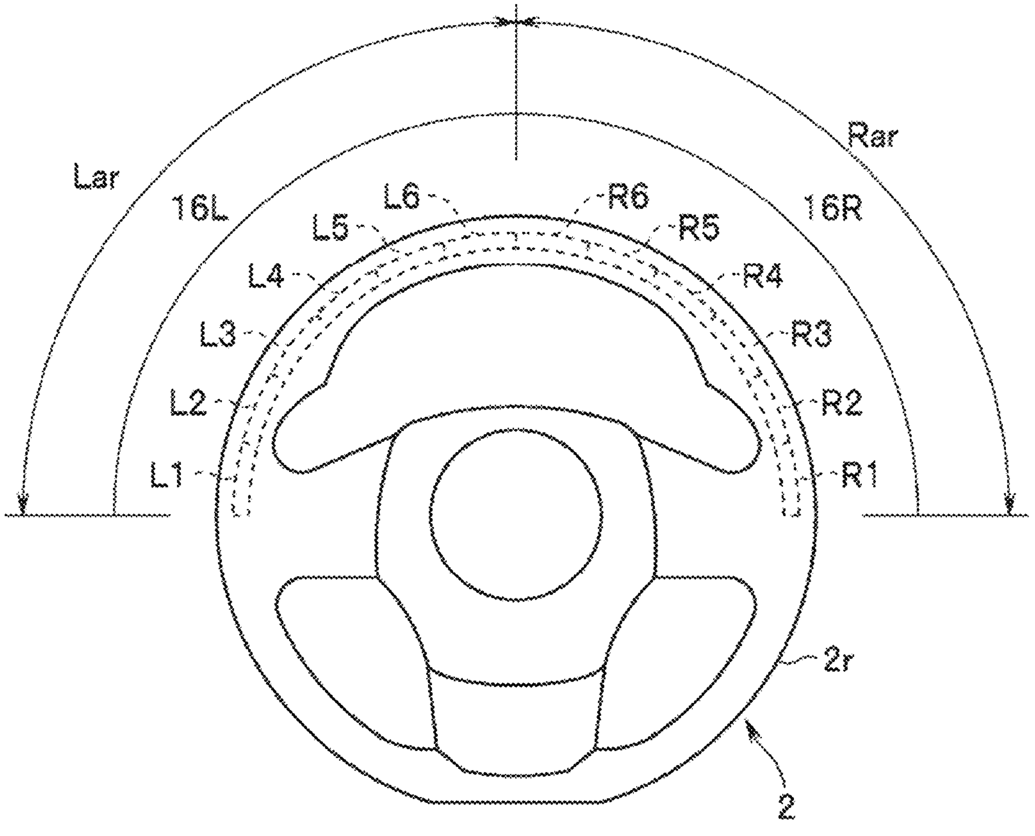
FIG. 3 is a front view of a steering to which right and left steering holding position sensors are attached.

As illustrated in FIG. 3, the right and left steering holding position sensor arrays 16R and 16L are disposed on the rim 2*r* of the steering 2. The left steering holding position sensor array 16L is disposed on the rim 2*r* in the second quadrant (upper-left quarter region) with the steering 2 being at a neutral position (the steering position in straight travelling). The right steering holding position sensor array 16R is disposed on the rim 2*r* in the first quadrant (upper-right quarter region) with the steering 2 being at the neutral position.

The right and left steering holding position sensor arrays 16R and 16L are made up of first to sixth pressure sensors R1 to R6 and L1 to L6, respectively. The pressure sensors R1 to R6 and L1 to L6 are evenly spaced on the rim 2*r* in the respective quadrants. The first to sixth pressure sensors R1 to R6 and L1 to L6 are, for example, piezoelectric sensors.

The steering advice computing unit 11 is configured to, when the driver holds the rim 2*r* of the steering 2, detect the steering holding positions of the driver by comparing physical quantities, such as voltages, generated in the pressure sensors R1 to R6 and L1 to L6. Note that the number of pressure sensors that form each of the right steering holding position sensor array 16R and the left steering holding position sensor array 16L is not limited to six.

Furthermore, the HUD 31 is coupled to the output side of the steering advice computing unit 11. The HUD 31 is provided in an instrument panel Mi illustrated in FIG. 2. An image projected from the HUD 31 is displayed in an image display area 31*a* provided in a windshield glass Mw. The image display area 31*a* is set at a position that does not disturb a driver's field of view and where a projected image is visible for the driver without much movement of the line of sight. In the present embodiment, the image display area 31*a* is set at the lower right of the windshield glass Mw. The HUD 31 is configured to project a colored image. Note that the image display area 31*a* is provided by applying a reflective coating on the windshield glass Mw. The reflective coating serves as a half mirror.

The image projected onto the image display area 31*a* is reflected and visually recognized by the driver. The image displayed on the image display area 31*a* is an image (steering image) 2*i* representing the steering 2. The steering image 2*i* constantly represents a state where the steering 2 is at a neutral position. Thus, the steering image 2*i* does not rotate synchronously even when the driver turns the steering 2 to the left or right.

Figure 4:
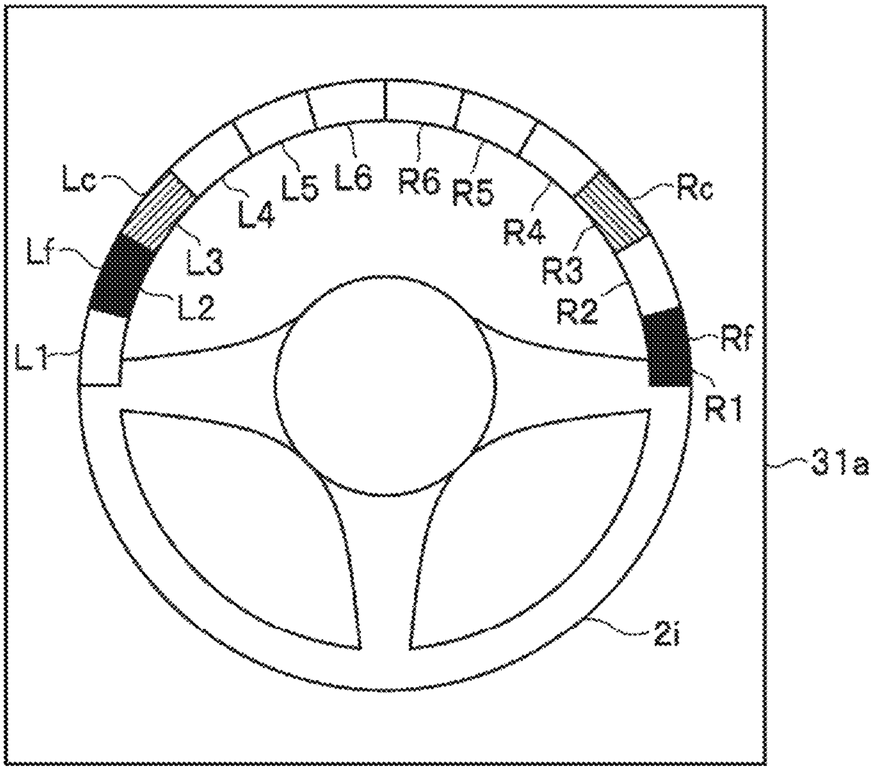
FIG. 4 is an explanatory drawing illustrating a display example of steering holding points to be advised when a vehicle enters a corner.

As illustrated in FIG. 4, the rim of the steering image 2*i* is divided into display regions so as to correspond to the first to sixth pressure sensors R1 to R6 and L1 to L6 of the right and left steering holding position sensor arrays 16R and 16L disposed on the rim 2*r* of the steering 2. Note that, in the following description, the display regions are denoted by the same reference signs as those of the pressure sensors R1 to R6 and L1 to L6 for convenience.

Figure 2:
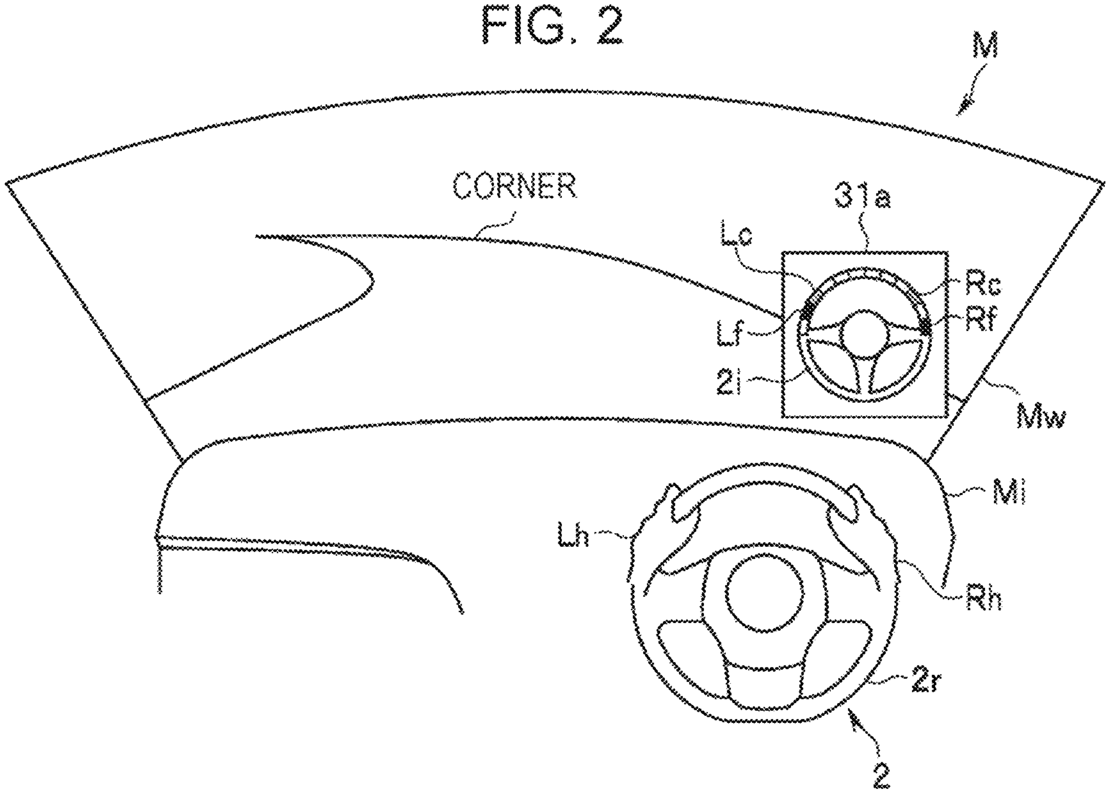
FIG. 2 is an explanatory drawing illustrating a state where steering holding positions are displayed on a head-up display.

As illustrated in FIGS. 2 and 4, images of steering holding positions Rc and Lc and images of instructed steering holding positions Rf and Lf are displayed in the first to sixth display regions R1 to R6 and L1 to L6 in the steering image 2*i* before the vehicle enters a corner.

The images of the steering holding positions Rc and Lc indicate the positions where the driver holds on the rim 2*r* of the steering 2. The images of the instructed steering holding positions Rf and Lf instruct the driver where to hold on the steering 2 before entering a corner. Note that the image of the steering holding positions Rc and Lc and the image of the instructed steering holding positions Rf and Lf displayed on the steering image 2*i* will be described in detail in the description of a flowchart described later.

In addition, as illustrated in FIG. 3, proper regions Rar and Lar are set as absolute regions for the steering 2. The proper regions Rar and Lar indicate the regions where the driver can perform an appropriate steering operation when the driver sits on the seat and holds the rim 2*r* of the steering 2 by both the hands Rh and Lh.

In the present embodiment, the right and left proper regions Rar and Lar are each set as a region from the top center of the steering 2 to 90 degrees right or left in a state where the driver faces the steering 2. Note that the right and left proper regions Rar and Lar are not limited to the regions described above, but may be set as the regions from the top center of the steering 2 to 90 or more degrees right or left.

The right and left proper regions Rar and Lar indicate proper steering holding regions for the driver. Because the proper regions Rar and Lar are absolute regions, the set positions are not changed even when the steering 2 is turned, as illustrated in FIG. 6B.

The steering advice computing unit 11 detects the positions where the driver holds on the steering 2 when the vehicle M is approaching a corner ahead. Then, the steering advice computing unit 11 determines whether the steering holding positions Rc and Lc are suitable for cornering. When the steering advice computing unit 11 determines that the positions where the driver holds on the steering 2 are not suitable, the steering advice computing unit 11 displays images of appropriate instructed steering holding positions Rf and Lf on the steering image 2*i* in the image display area 31*a*.

Figure 5:
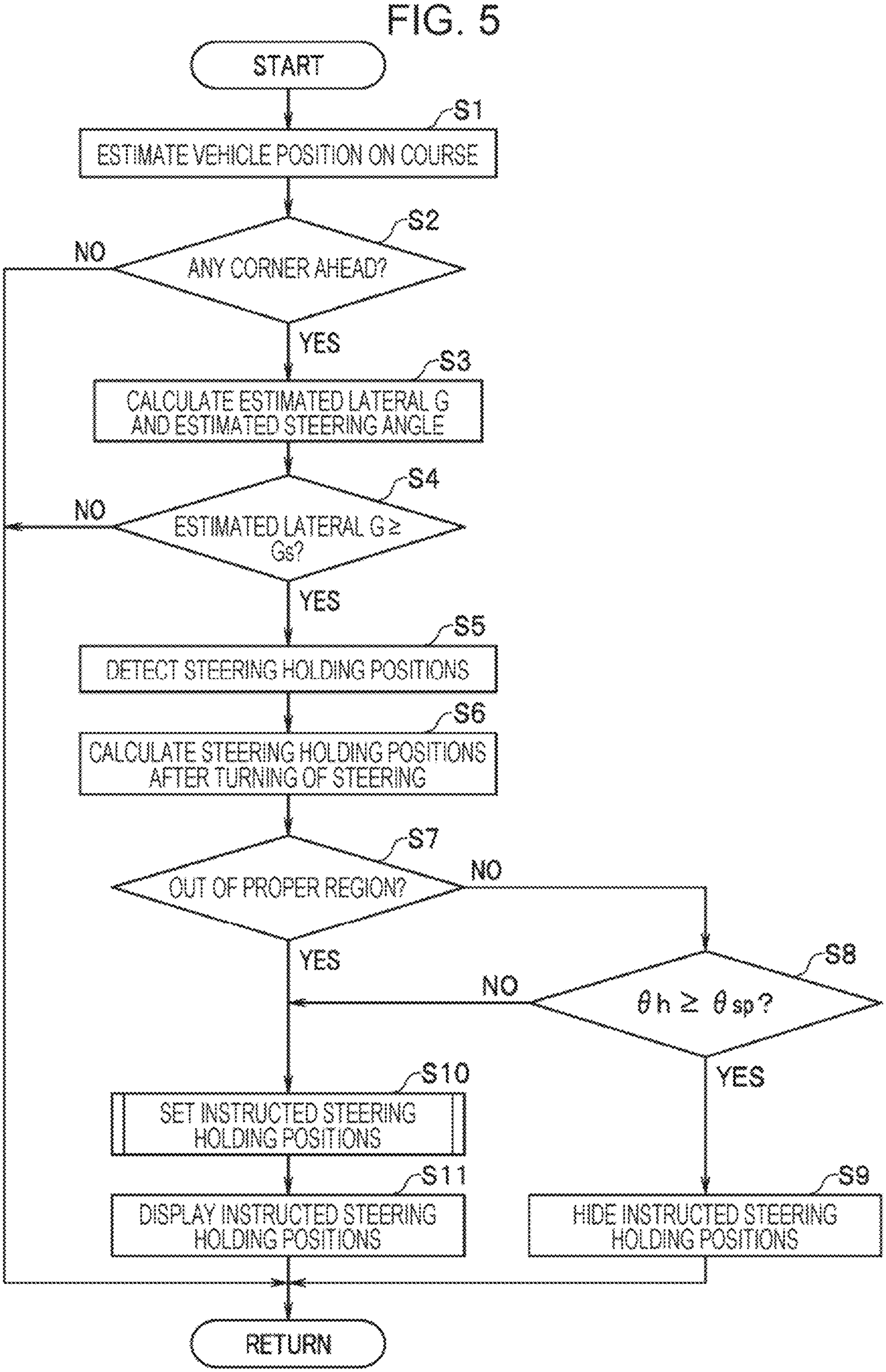
FIG. 5 is a flowchart illustrating a steering holding position instruction display routine.

The display of images of the instructed steering holding positions Rf and Lf by the steering advice computing unit 11 is controlled according to, for example, a steering holding position instruction display routine illustrated in FIG. 5. This routine is executed at each predetermined computing cycle after the system is activated. Note that the position information of the vehicle M estimated by the vehicle position estimation computing unit 13*a* of the map locator computing unit 13 and the course information of the circuit where the vehicle M will run obtained by the map information acquiring unit 13*b* are input in advance to the steering advice computing unit 11.

While the vehicle M is driven by the driver in the circuit, the steering advice computing unit 11 first estimates the position of the vehicle on the circuit course (step S1). The estimation of the vehicle position is executed by map matching the position information of the vehicle M estimated by the vehicle position estimation computing unit 13*a* to the road map data of the circuit.

Next, the steering advice computing unit 11 performs a determination as to whether a corner is present in a travelling direction of the vehicle M (step S2). The determination as to whether a corner is present in the travelling direction of the vehicle M is performed based on the vehicle position estimated in step S1 and the course information. Alternatively, a corner may be detected based on the information on the travelling environment in front of the vehicle M acquired by the camera unit 21. Note that the processing of step S2 may correspond to a corner detector according to the embodiment of the present disclosure.

When the steering advice computing unit 11 determines that a corner is present in the travelling direction of the vehicle M (YES in step S2), the routine proceeds to step S3. Meanwhile, when the steering advice computing unit 11 determines that no corner is present in the travelling direction of the vehicle M (NO in step S2), the routine is finished.

When the routine proceeds to step S3, the steering advice computing unit 11 calculates an estimated lateral acceleration (estimated lateral G) and an estimated steering angle. During cornering, the angle of the steering is gradually increased as the vehicle M enters the corner and is gradually decreased as the vehicle M moves toward the exit of the corner. The estimated steering angle is the largest steering angle during the cornering.

The steering advice computing unit 11 calculates the estimated lateral G and the estimated steering angle based on the vehicle speed detected by the vehicle speed sensor 18 and the curvature of the corner. The curvature of the corner is acquired from the course information. Alternatively, the curvature may be calculated based on the information on the travelling environment in front of the vehicle M acquired by the camera unit 21. Thus, the processing of step S3 may serve as an estimated steering angle calculating unit and a curvature calculating unit according to the embodiment of the present disclosure.

Next, the steering advice computing unit 11 compares the estimated lateral G with a lateral G determination threshold Gs (step S4). The lateral G determination threshold Gs is a lateral G generated in cornering under which the driver does not receive a strong rolling force. With such a lateral G (a low speed, a small steering angle, or the like) under which the driver does not receive a strong rolling force, the driver does not change the holding positions on the steering 2 before entering the corner. The lateral G determination threshold Gs may be a fixed value or a variable that the driver can set in advance.

Then, when the estimated lateral G≥Gs (YES in step S4), the routine proceeds to step S5. When the estimated lateral G<Gs (NO in step S4), the routine is finished.

In step S5, the steering advice computing unit 11 detects the positions (steering holding positions) where the driver currently holds on the rim 2*r* of the steering 2. The positions where the driver holds on the rim 2*r* are detected based on the signals from the first to sixth pressure sensors R1 to R6 and L1 to L6 of the right and left steering holding position sensor arrays 16R and 16L disposed on the rim 2*r*.

The steering advice computing unit 11 sets the position of the pressure sensor that detects the maximum pressure among the pressure sensors L1 to L6 of the left steering holding position sensor array 16L as the steering holding position Lc of the left hand Lh. The steering advice computing unit 11 sets the position of the pressure sensor that detects the maximum pressure among the pressure sensors R1 to R6 of the right steering holding position sensor array 16R as the steering holding position Rc of the right hand Rh.

FIGS. 6A, 7A, 8A, and 9A illustrate examples where the steering holding positions Rc and Lc of the right and left hands Rh and Lh of the driver are set.

Figure 6A:
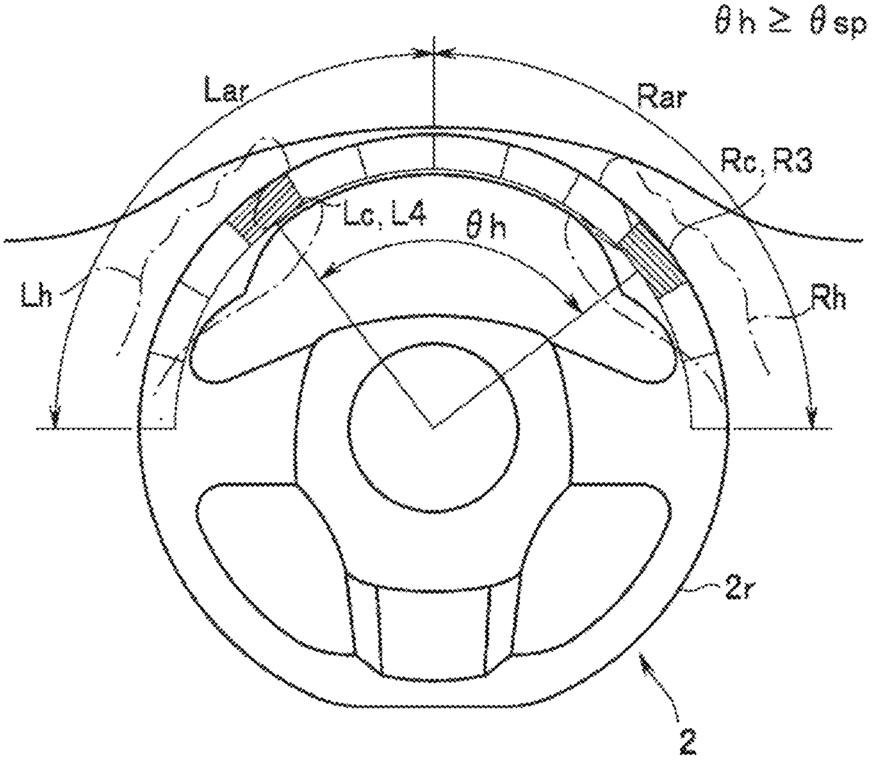
FIG. 6A is an explanatory drawing illustrating steering holding positions of a driver detected by steering holding position sensors.
Figure 6B:
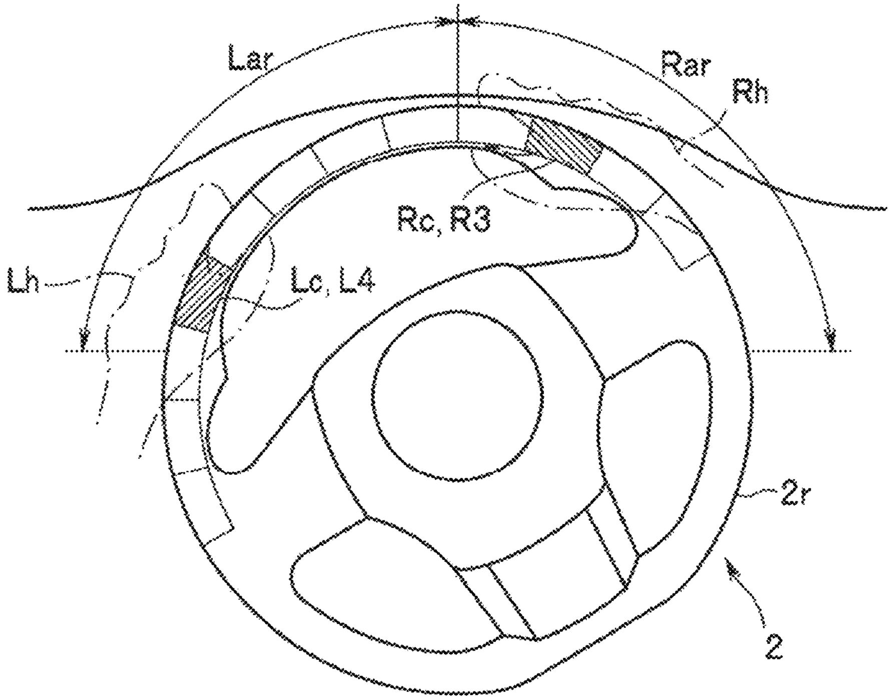
FIG. 6B is an explanatory drawing illustrating a state where the steering is turned by the driver at the steering holding positions.

In FIG. 6A, as indicated by hatching, the steering advice computing unit 11 detects highest pressures at the fourth pressure sensor L4 of the left steering holding position sensor array 16L and the third pressure sensor R3 of the right steering holding position sensor array 16R. Thus, the steering advice computing unit 11 sets the position of the fourth pressure sensor L4 as the steering holding position Lc of the left hand Lh and the position of the third pressure sensor R3 as the steering holding position Rc of the right hand Rh.

Figure 7A:
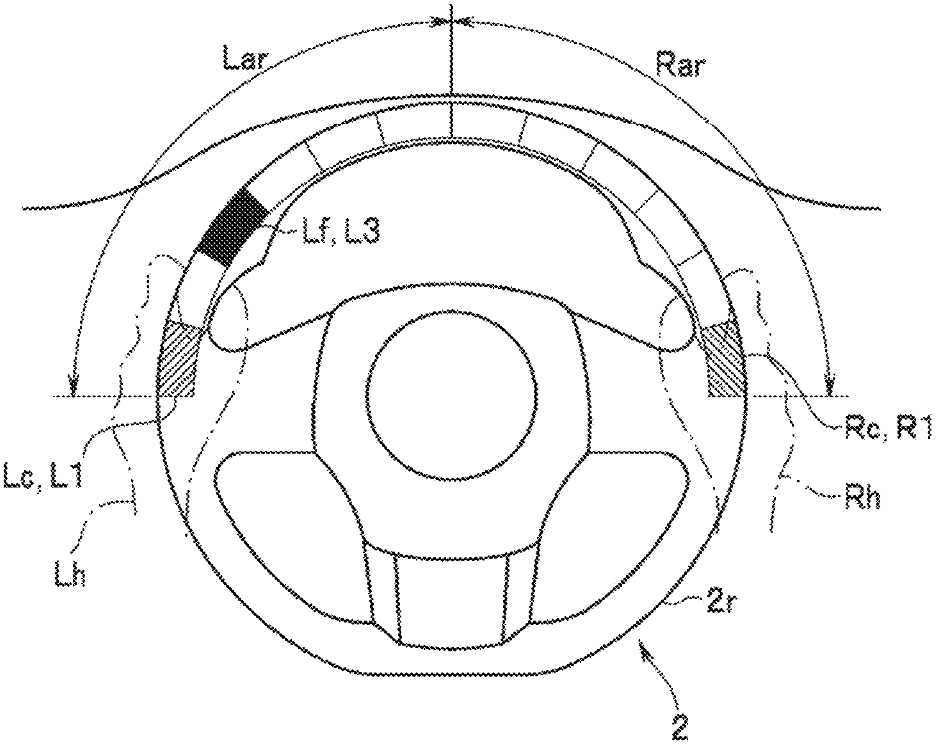
FIG. 7A is an explanatory drawing illustrating steering holding positions of the driver detected by steering holding position sensors and an instructed steering holding position.

In FIG. 7A, as indicated by hatching, the steering advice computing unit 11 detects highest pressures at the first pressure sensor L1 of the left steering holding position sensor array 16L and the first pressure sensor R1 of the right steering holding position sensor array 16R. Thus, the steering advice computing unit 11 sets the position of the first pressure sensor L1 as the steering holding position Lc of the left hand Lh and the position of the first pressure sensor R1 as the steering holding position Rc of the right hand Rh.

Figure 8A:
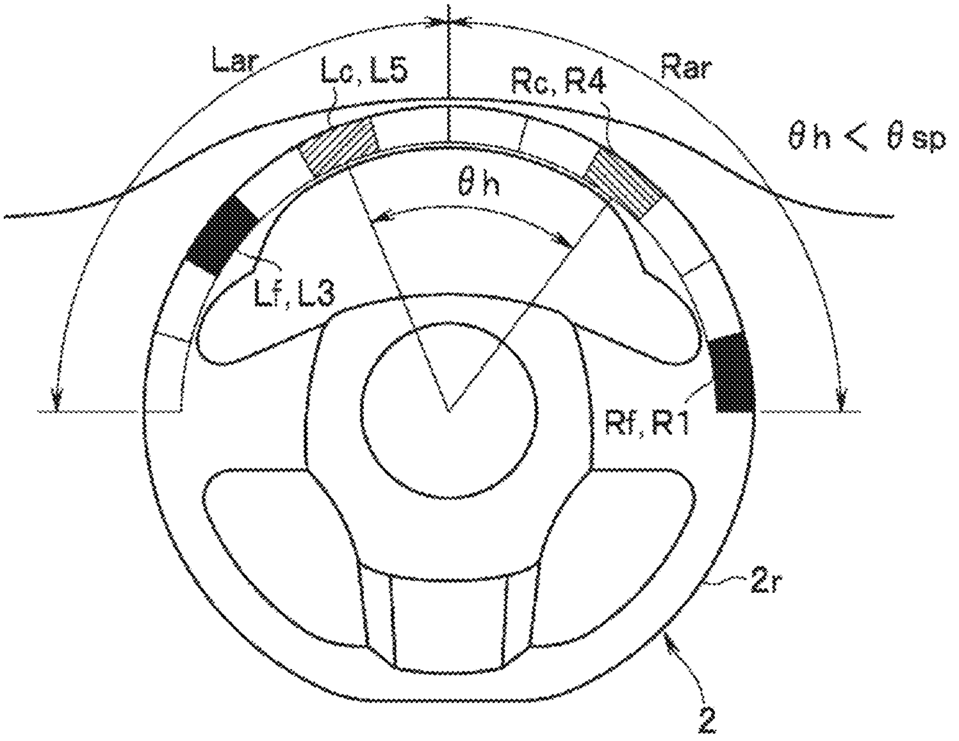
FIG. 8A is an explanatory drawing illustrating instructed steering holding positions to be set when a distance angle between the steering holding positions of the driver is small.

In FIG. 8A, as indicated by hatching, the steering advice computing unit 11 detects highest pressures at the fifth pressure sensor L5 of the left steering holding position sensor array 16L and the fourth pressure sensor R4 of the right steering holding position sensor array 16R. Thus, the steering advice computing unit 11 sets the position of the fifth pressure sensor L5 as the steering holding position Lc of the left hand Lh and the position of the fourth pressure sensor R4 as the steering holding position Rc of the right hand Rh.

Figure 9A:
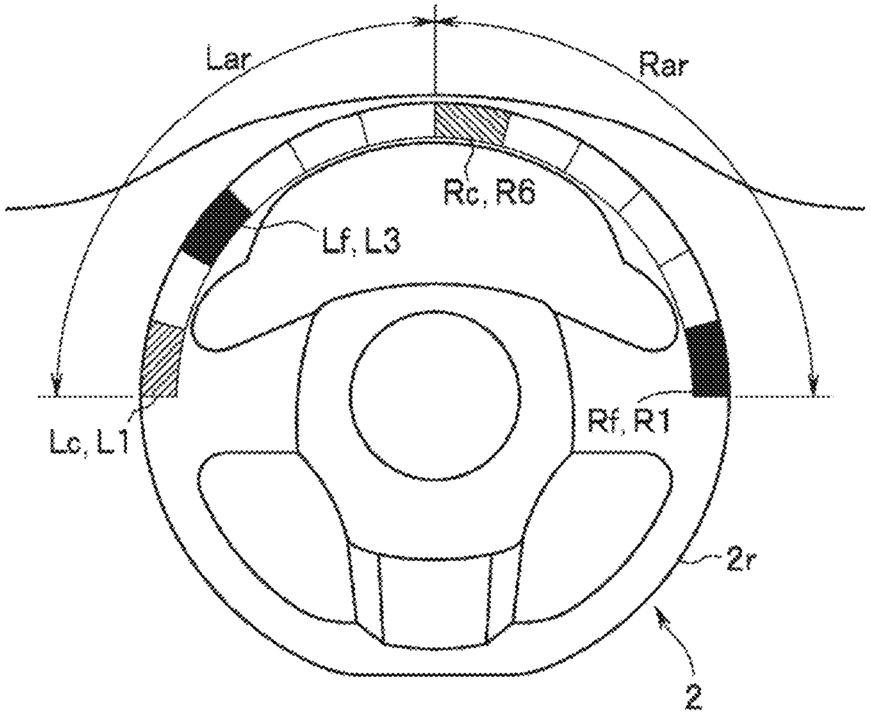
FIG. 9A is an explanatory drawing illustrating steering holding positions anticipated and held by the driver before the vehicle enters a curve and instructed steering holding positions.

In FIG. 9A, as indicated by hatching, the steering advice computing unit 11 detects highest pressures at the first pressure sensor L1 of the left steering holding position sensor array 16L and the sixth pressure sensor R6 of the right steering holding position sensor array 16R. Thus, the steering advice computing unit 11 sets the position of the first pressure sensor L1 as the steering holding position Lc of the left hand Lh and the position of the sixth pressure sensor R6 as the steering holding position Rc of the right hand Rh.

Next, the steering advice computing unit 11 calculates the steering holding positions (turned steering holding positions) Rc and Lc after the steering 2 is operated (turned) at the estimated steering angle calculated in step S3 (step S6). When the estimated steering angle is, for example, 30 degrees to the left, it can be estimated that the driver holds the rim 2*r* of the steering 2 and turns the steering 2 by 30 degrees to the left. Thus, the steering holding positions Rc and Lc are moved in the same direction by 30 degrees. Note that the processing of step S6 may correspond to a turned steering position calculating unit according to the embodiment of the present disclosure.

Then, the steering advice computing unit 11 determines whether the turned steering holding positions Rc and Lc are out of the proper regions Rar and Lar (refer to FIG. 3) (step S7). When the turned steering holding positions Rc and Lc are in the proper regions Rar and Lar (NO in step S7), the routine branches to step S8. When the turned steering holding positions Rc and Lc are out of the proper regions Rar and Lar (YES in step S7), the routine proceeds to step S10. Note that the processing of step S7 may correspond to a proper region determining unit according to the embodiment of the present disclosure.

Figure 7B:
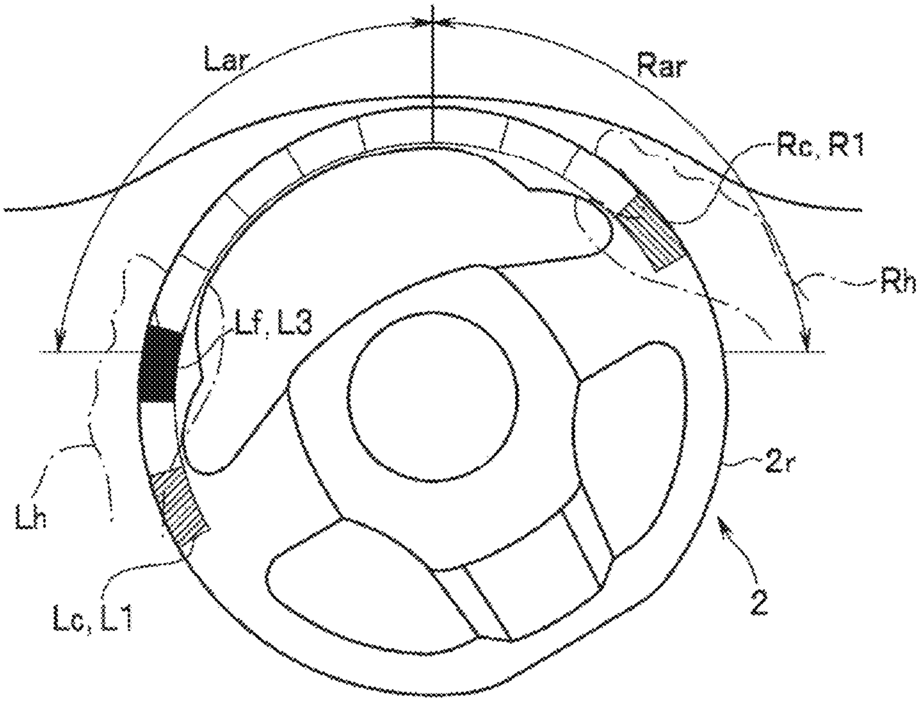
FIG. 7B is an explanatory drawing illustrating a state where the steering is turned by the driver at the instructed steering holding position of FIG. 7A.

For example, even when the steering 2 is turned by 30 degrees to the left from the state illustrated in FIG. 6A, the steering holding positions Rc and Lc are within the proper regions Rar and Lar, as illustrated in FIG. 6B. When the steering 2 is turned by 30 degrees to the left from the state illustrated in FIG. 7A, the right steering holding position Rc is within the proper region Rar but the left steering holding position Lc is out of the proper region Lar, as illustrated in FIG. 7B.

Figure 8B:
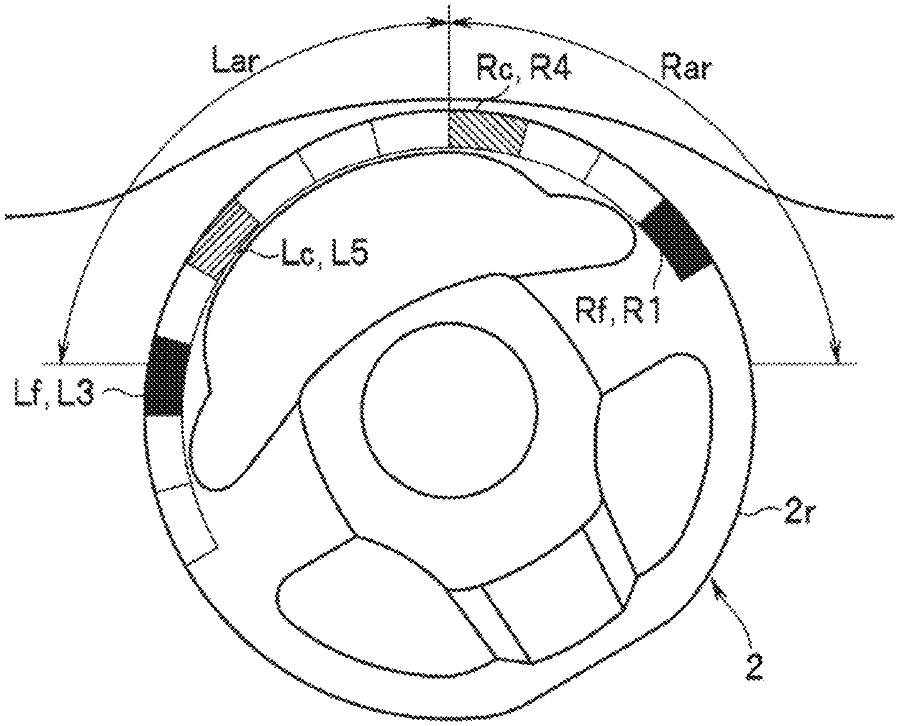
FIG. 8B is an explanatory drawing illustrating a state where the steering is turned by the driver at the instructed steering holding positions of FIG. 8A.
Figure 9B:
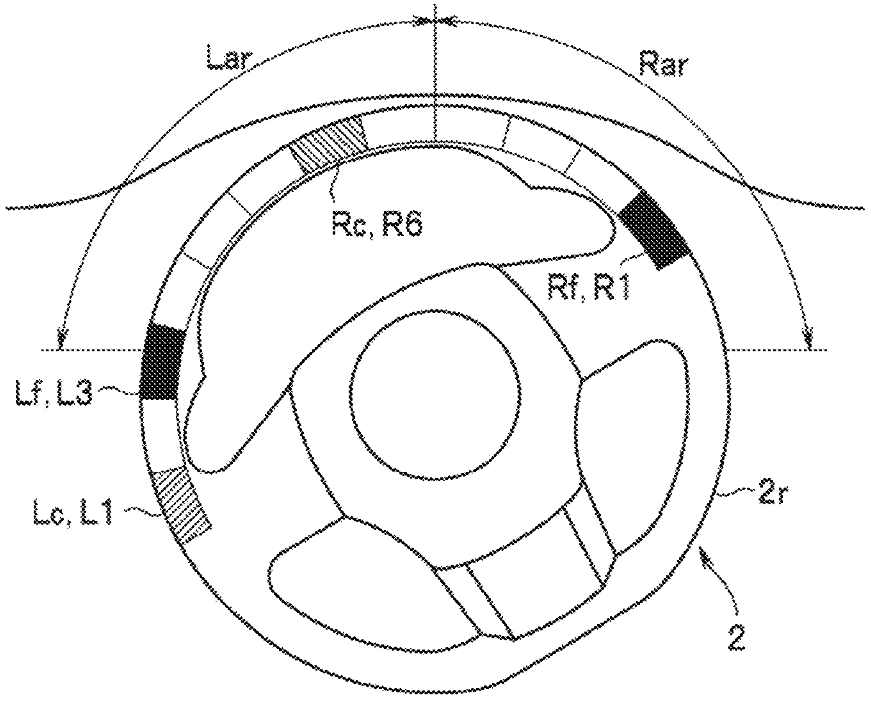
FIG. 9B is an explanatory drawing illustrating a state where the steering is turned by the driver at the instructed steering holding positions of FIG. 9A.

In addition, when the steering 2 is turned by 30 degrees to the left from the state illustrated in FIG. 8A, the steering holding positions Rc and Lc are within the proper regions Rar and Lar, as illustrated in FIG. 8B. When the steering 2 is turned by 30 degrees to the left from the state illustrated in FIG. 9A, the steering holding positions Rc and Lc are out of the proper regions Rar and Lar, as illustrated in FIG. 9B.

Thus, the steering holding patterns of FIGS. 7A and 9A are determined as YES in step S7. The steering holding patterns of FIGS. 6A and 8A are determined as NO in step S7.

When the routine branches to step S8, the steering advice computing unit 11 compares a separation angle θh between the steering holding positions Rc and Lc with a separation angle determination threshold θsp. Note that the processing of step S8 may correspond to a separation angle comparing unit according to the embodiment of the present disclosure.

The separation angle determination threshold θsp is used to perform a determination as to whether the driver's body can be supported during a steering operation when both the hands Rh and Lh of the driver are placed at the steering holding positions Rc and Lc apart at the separation angle θh. The separation angle determination threshold θsp may be a fixed value, such as 75 degrees, but may be a variable that the driver sets.

Then, when the steering advice computing unit 11 determines that θh≥θsp (YES in step S8), the routine proceeds to step S9. When θh≥θsp, it can be estimated that the driver's body can be supported without changing the holding positions of the driver's hands on the steering 2. This positional relationship corresponds to the steering holding pattern of FIG. 6A and is determined as YES in step S8.

Meanwhile, when the steering advice computing unit 11 determines that θh<θsp (NO in step S8), the routine proceeds to step S10. When θh<θsp, it can be estimated that the driver's body cannot be supported during the steering operation if the holding positions of the driver's hands on the steering 2 are not changed because the distance between the current steering holding positions is small. This positional relationship corresponds to the steering holding pattern of FIG. 8A and is determined as NO in step S8.

When the routine proceeds to step S9, the steering advice computing unit 11 does not display instructed steering holding positions on the image display area 31*a* and the routine is finished. As a result, the steering advice computing unit 11 outputs a non-display signal to the HUD 31. The HUD 31 does not project the steering image 2*i* on the image display area 31*a* in response to the non-display signal transmitted from the steering advice computing unit 11.

In addition, when the routine proceeds to step S10 from step S7 or S8, the steering advice computing unit 11 calculates suitable instructed steering holding positions Rf and Lf for the driver in cornering. In the present embodiment, the steering holding positions suitable for straight travelling are set at the positions (a so-called 9:15 position) that the right and left first pressure sensors R1 and L1 can detect. Note that the processing of step S10 may correspond to an instructed steering holding position setting unit according to the embodiment of the present disclosure.

The steering advice computing unit 11 is configured to set the instructed steering holding positions Rf and Lf according to Case 1 or Case 2 described below.

In Case 1, where one of the steering holding positions Rc and Lc after the steering is turned is estimated to be out of the proper region Rar or Lar, the instructed steering holding position Rf or Lf is set to change the holding position of the hand Rh or Lh placed outside the proper region Rar or Lar to a position that is within the proper region Rar or Lar and where the hand Rh or Lh can be detected by a pressure sensor closest to the corresponding first pressure sensor.

In Case 2, where both of the steering holding positions Rc and Lc after the steering is turned are estimated to be within the proper regions Rar and Lar but the separation angle θh between the steering holding positions Rc and Lc is estimated to be smaller than the separation angle determination threshold θsp, the instructed steering holding positions Rf and Lf are set to change the holding positions to positions that are within the proper regions Rar and Lar and where the hands Rh and Lh can be detected by pressure sensors closest to the first pressure sensors.

With reference to the examples of steering holding patterns illustrated in FIGS. 7A to 9A when the steering 2 is to be turned in front of a left curve, examples of the instructed steering holding positions Rf and Lf set by the steering advice computing unit 11 according to Case 1 and Case 2 will be described below.

Case 1

In the steering holding pattern of FIG. 7A, the steering holding position Rc of the right hand Rh stays in the proper region Rar even when the steering 2 is turned. Thus, the steering advice computing unit 11 does not calculate an instructed steering holding position for the right hand Rh. Meanwhile, the steering holding position Lc of the left hand Lh goes out of the proper region Lar when the steering 2 is turned. Thus, the steering advice computing unit 11 sets, as the left instructed steering holding position Lf, a position that is within the proper region Lar and where the left hand Lh can be detected by the third pressure sensor L3, which is closest to the first pressure sensor L1.

In the steering holding pattern of FIG. 9A, the steering holding positions Rc and Lc of both the hands Rh and Lh go out of the proper regions Rar and Lar when the steering 2 is turned. Thus, the steering advice computing unit 11 sets, as the left instructed steering holding position Lf, a position that is within the proper region Lar and where the left hand Lh can be detected by the third pressure sensor L3, which is closest to the first pressure sensor L1. Meanwhile, because the first pressure sensor R1 is present in the proper region Rar, the steering advice computing unit 11 sets a position where the right hand Rh can be detected by the first pressure sensor, as the right instructed steering holding position Rf.

Case 2

In the steering holding pattern of FIG. 8A, the separation angle θh between the steering holding positions Rc and Lc is small (θh<θsp). Thus, the steering advice computing unit 11 sets, as the left instructed steering holding position Lf, a position that is within the proper region Lar and where the left hand Lh can be detected by the third pressure sensor L3, which is closest to the first pressure sensor L1. Meanwhile, because the first pressure sensor R1 is present in the right proper region Rar, the steering advice computing unit 11 sets a position where the right hand Rh can be detected by the first pressure sensor, as the right instructed steering holding position Rf.

The steering advice computing unit 11 then outputs an instruction signal for displaying the instructed steering holding positions Rf and Lf calculated in step S10 to the HUD 31 (step S11) and finishes the routine. Note that the processing of step S11 may correspond to a display instruction unit according to the embodiment of the present disclosure.

Then, the HUD 31 displays images of the current steering holding positions Rc and Lc and images of the instructed steering holding positions Rf and Lf on the steering image 2*i* of the image display area 31*a* according to the instruction signal transmitted from the steering advice computing unit 11. By displaying the images of the current steering holding positions Rc and Lc and the images of the instructed steering holding positions Rf and Lf on the steering image 2*i*, the driver can instantly recognize where to move both the hands Rh and Lh to change the steering holding positions from the current steering holding positions.

Various embodiments are conceivable to cause the driver to instantly distinguish between the images of the steering holding positions Rc and Lc and the images of the instructed steering holding positions Rf and Lf. For example, the images of the steering holding positions Rc and Lc are displayed in a chromatic color, such as green, and the images of the instructed steering holding positions Rf and Lf are displayed in another chromatic color, such as red, by blinking or flashing. Alternatively, the images of the steering holding positions Rc and Lc and the images of the instructed steering holding positions Rf and Lf are displayed in different chromatic colors.

Examples of image display patterns corresponding to the steering holding patterns of FIGS. 7A, 8A, and 9A described above are illustrated in FIGS. 7C, 8C, and 9C.

Figure 7C:
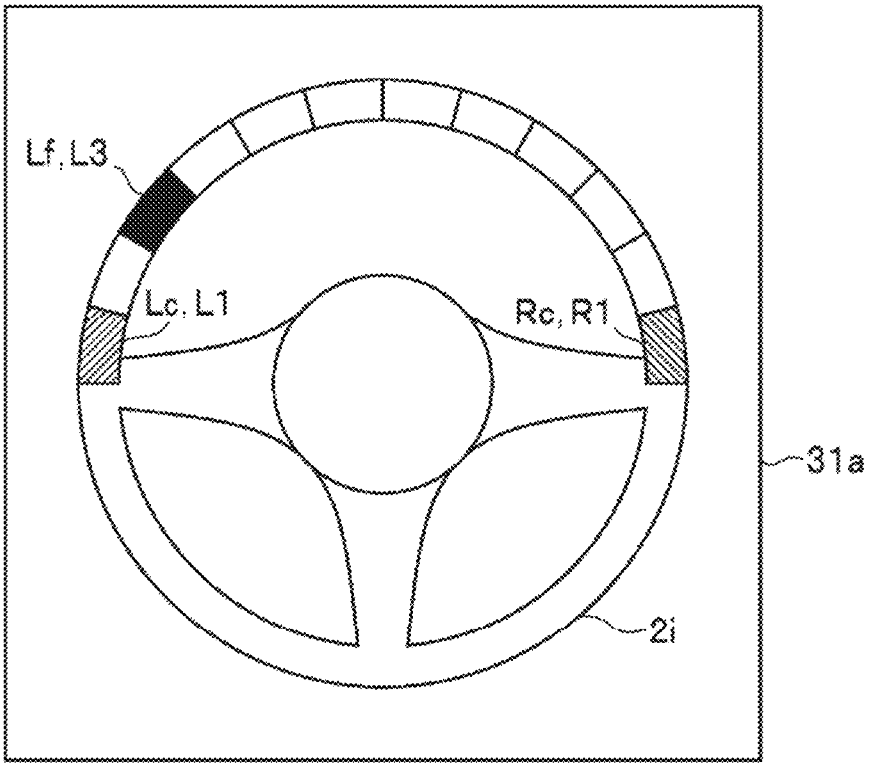
FIG. 7C is an explanatory drawing illustrating a display example of a steering holding position image and an instructed steering holding position image of FIG. 7A.

In FIG. 7C, the steering image 2*i* displays the right and left steering holding positions Rc and Lc and the left instructed steering holding position Lf for changing the position of the left hand Lh because the left steering holding position Lc goes out of the left proper region Lar when the steering 2 is turned.

Figure 8C:
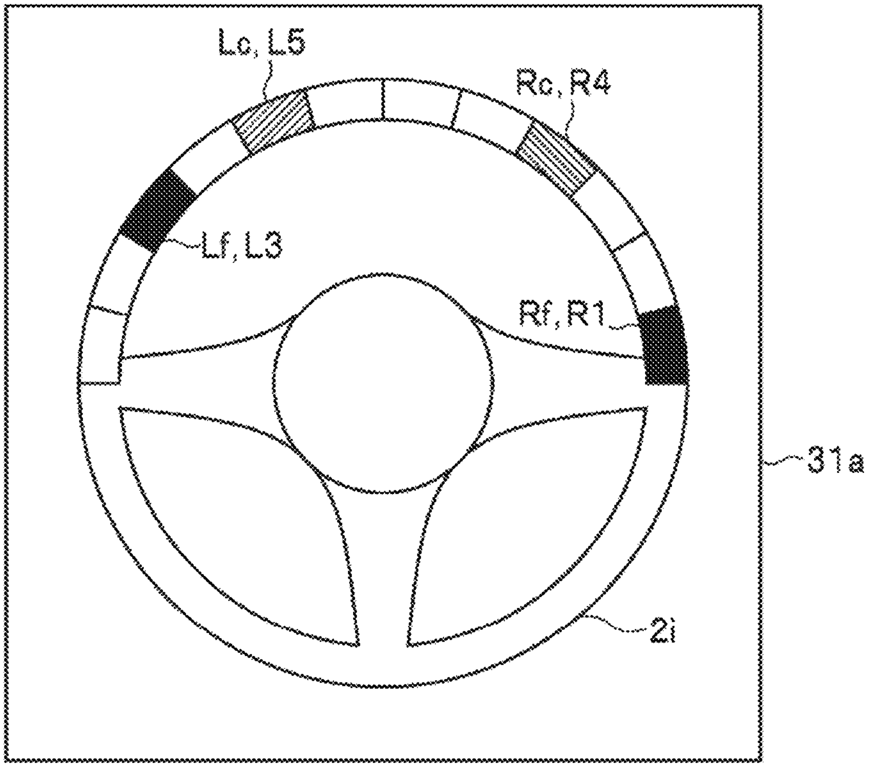
FIG. 8C is an explanatory drawing illustrating a display example of a steering holding position image and an instructed steering holding position image of FIG. 8A.

In FIG. 8C, the steering image 2*i* displays the right and left steering holding positions Rc and Lc and the instructed steering holding positions Rf and Lf for changing the positions of both the hands Rh and Lh because the distance between the steering holding positions Rc and Lc is small.

Figure 9C:
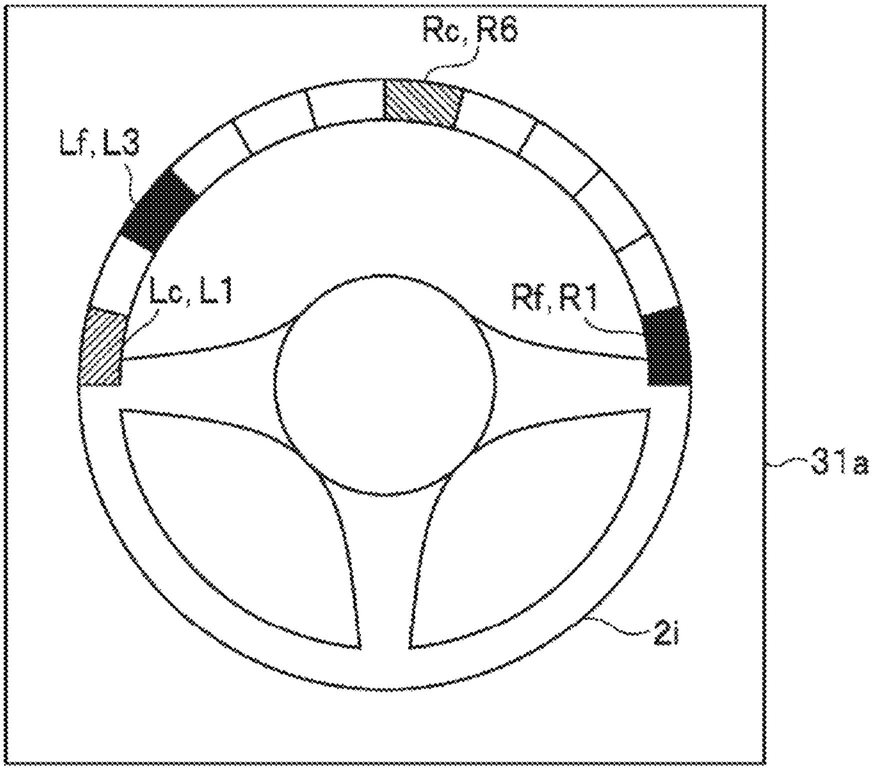
FIG. 9C is an explanatory drawing illustrating a display example of a steering holding position image and an instructed steering holding position image of FIG. 9A.

In FIG. 9C, the steering image 2*i* displays the right and left steering holding positions Rc and Lc and the instructed steering holding positions Rf and Lf for changing the positions of both the hands Rh and Lh because the right and left steering holding positions Rc and Lc go out of the proper regions Rar and Lar when the steering 2 is turned.

As described above, in the present embodiment, when the driver drives the vehicle at high speed on a race track, such as a circuit, the driver is advised of the instructed steering holding positions Rf and Lf suitable for cornering before entering a corner. As a result, during cornering, the driver's body can be supported by both the hands Rh and Lh holding the steering 2. Because the body of the driver is securely supported during cornering, the driver can perform accurate operations of the steering, accelerator, and brake.

In addition, images of the instructed steering holding positions Rf and Lf are displayed on the steering image 2*i*, which is projected from the HUD 31 onto the image display area 31*a* set in the windshield glass Mw. As a result, the driver can instantly recognize the instructed steering holding positions Rf and Lf without much movement of the line of sight before entering a corner.

Further, the images of the current steering holding positions Rc and Lc and the images of the instructed steering holding positions Rf and Lf are displayed on the steering image 2*i*. Thus, the driver can instantly recognize which direction to move both the hands Rh and Lh to change the steering holding positions from the current steering holding positions. When either of the hands Rh and Lh is allowed to be kept at the current steering holding position Rc or Lc, the instructed steering holding position Rf or Lf is not displayed for that hand. Thus, the driver can instantly recognize which hand Rh or Lh to move without confusion.

Furthermore, when it is assumed that both the hands are allowed to be kept at the steering holding positions Rc and Lc after the steering 2 is turned, the steering image 2*i* is not displayed. Thus, the driver feels less annoyed with the display.

The embodiment of the present disclosure is not limited to the embodiment described above. For example, the display of the images of the steering holding positions Rc and Lc may be omitted and the images of the instructed steering holding positions Rf and Lf may be displayed on the image display area 31*a*. For each of the right and left steering holding position sensor arrays 16R and 16L, more than six pressure sensors may be provided. The proper regions Rar and Lar may each extend to over 90 degrees. Each sensor included in the right and left steering holding position sensor arrays 16R and 16L may be a capacitive sensor or an optical sensor. The image display area 31*a* may be formed as a monitor disposed on the instrument panel or the like.

In a sequence of corners, an out-in-out driving line is used. This driving line has large turning radii and thus the steering 2 is not turned largely in a relative sense. Thus, the instructed steering holding positions Rf and Lf set in step S10 are set to positions where the driver can drive without changing the steering holding positions until the sequence of corners is over.

According to the embodiment of the present disclosure, when a corner is detected in the traveling direction, an estimated steering angle of the steering is calculated for cornering. When the steering holding positions of the driver after the steering is turned at the estimated steering angle are out of the proper regions, the instructed steering holding positions are set in the proper regions and images of the instructed steering holding positions are displayed on the image display area. Thus, when the driver enters a corner at high speed, the driver can receive an appropriate advice on the instructed steering holding positions that enable the driver to perform a steering operation while the driver's body is supported.

The steering advice computing unit 11 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the steering advice computing unit 11 including the corner detector, the curvature calculating unit, the estimated steering angle calculating unit, the turned steering position calculating unit, the proper region determining unit, the instructed steering holding position setting unit, the display instruction unit, and the separation angle comparing unit. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A steering advice device configured to be applied to a vehicle, the steering advice device comprising:

an image display area provided at a position visible from a driver who drives the vehicle;

a vehicle speed detector configured to detect a speed of the vehicle;

a steering holding position detector configured to detect a steering holding position of each of hands of the driver on a steering; and a steering advice computing unit, wherein the steering has a proper region set as an absolute region in which the driver can appropriately perform a steering operation while holding the steering, and the steering advice computing unit comprises a corner detector configured to detect a corner in a travelling direction of the vehicle, a curvature calculating unit configured to calculate a degree of curvature of the corner detected by the corner detector, an estimated steering angle calculating unit configured to calculate an estimated steering angle of the steering for cornering based on the speed of the vehicle detected by the vehicle speed detector and the degree of curvature of the corner calculated by the curvature calculating unit, a turned steering position calculating unit configured to calculate a turned steering holding position to be obtained by turning the steering at the estimated steering angle calculated by the estimated steering angle calculating unit, a proper region determining unit configured to determine whether the turned steering holding position calculated by the turned steering position calculating unit is out of the proper region, an instructed steering holding position setting unit configured to set an instructed steering holding position in the proper region when the proper region determining unit determines that the turned steering holding position calculated by the turned steering position calculating unit is out of the proper region, and a display instruction unit configured to display an image of the instructed steering holding position set by the instructed steering holding position setting unit in the image display area.

2. The steering advice device according to claim 1, wherein the steering advice computing unit further comprises a separation angle comparing unit configured to compare a separation angle between steering holding positions of the hands of the driver holding on the steering detected by the steering holding position detector with a separation angle determination threshold set in advance, and the instructed steering holding position setting unit is configured to, even when the proper region determining unit determines that the turned steering holding position calculated by the turned steering position calculating unit is within the proper region, set the instructed steering holding position that is within the proper region and is larger than the separation angle determination threshold set in advance, when the separation angle comparing unit determines that the separation angle between the steering holding positions is smaller than the separation angle determination threshold.

3. The steering advice device according to claim 1, wherein a detection region of the steering holding position detector and the proper region are set as a same region when the steering is at a neutral position.

4. The steering advice device according to claim 1, wherein the image display area is provided on a windshield glass, and a steering image is displayed in the image display area and the image of the instructed steering holding position is displayed on the steering image.

5. The steering advice device according to claim 1, wherein the image display area is provided on a windshield glass, and a steering image is displayed in the image display area and an image of the steering holding position detected by the steering holding position detector and the image of the instructed steering holding position are displayed on the steering image.

6. A steering advice device configured to be applied to a vehicle, the steering advice device comprising:

an image display area provided at a position visible from a driver who drives the vehicle;

a vehicle speed detector configured to detect a speed of the vehicle;

a steering holding position detector configured to detect a steering holding position of each of hands of the driver on a steering; and circuitry wherein the steering has a proper region set as an absolute region in which the driver can appropriately perform a steering operation while holding the steering, and the circuitry is configured to detect a corner in a travelling direction of the vehicle, calculate a degree of curvature of the detected corner, calculate an estimated steering angle of the steering for cornering based on the speed of the vehicle detected by the vehicle speed detector and the calculated degree of curvature of the corner, calculate a turned steering holding position to be obtained by turning the steering at the calculated estimated steering angle, determine whether the calculated turned steering holding position is out of the proper region, set an instructed steering holding position in the proper region, when the calculated turned steering holding position is determined to be out of the proper region, and display an image of the set instructed steering holding position in the image display area.

* * * * *